United States Patent
Barale et al.

(10) Patent No.: US 12,435,810 B2
(45) Date of Patent: Oct. 7, 2025

(54) HOUSING FOR ELECTROMAGNETIC VALVES, TUBULAR ELEMENT AND RELATED ELECTROMAGNETIC VALVE

(71) Applicant: ELBI INTERNATIONAL S.P.A, Turin (IT)

(72) Inventors: Emanuele Barale, Cuneo (IT); Settimo Amico, Shandong (CN)

(73) Assignee: ELBI INTERNATIONAL S.P.A., Turin (IT)

( * ) Notice: Subject to any disclaimer, the term of this patent is extended or adjusted under 35 U.S.C. 154(b) by 3 days.

(21) Appl. No.: 18/699,254

(22) PCT Filed: Oct. 6, 2022

(86) PCT No.: PCT/IB2022/059538
§ 371 (c)(1),
(2) Date: Apr. 5, 2024

(87) PCT Pub. No.: WO2023/057941
PCT Pub. Date: Apr. 13, 2023

(65) Prior Publication Data
US 2024/0410487 A1    Dec. 12, 2024

(30) Foreign Application Priority Data
Oct. 7, 2021  (IT) .......................... 102021000025688

(51) Int. Cl.
*F16K 31/06* (2006.01)
(52) U.S. Cl.
CPC ................. *F16K 31/0675* (2013.01)
(58) Field of Classification Search
CPC .................................................. F16K 31/0675
See application file for complete search history.

(56) References Cited

U.S. PATENT DOCUMENTS

| 3,896,405 A * | 7/1975 | Pauli | F16K 31/0675 335/255 |
| 8,477,002 B2 * | 7/2013 | Hoppe | F01L 1/344 335/278 |

(Continued)

FOREIGN PATENT DOCUMENTS

| EP | 0840048 A1 | 5/1998 |
| FR | 2552582 A3 | 3/1985 |
| GB | 2296075 A | 6/1996 |

OTHER PUBLICATIONS

International Search Report and Written Opinion for PCT/IB2022/059538 (Dec. 12, 2022).

(Continued)

*Primary Examiner* — Umashankar Venkatesan
(74) *Attorney, Agent, or Firm* — Merchant & Gould P.C.

(57) ABSTRACT

A housing for electromagnetic valves is adapted to internally receive a core and allow the core to slide therein for switching the electromagnetic valve. At least a portion of the housing is adapted to be surrounded by a coil in the electromagnetic valve. The housing extends along an axis and includes a distal end and an open proximal end. The housing has a locking system adapted to lock the coil. The locking system is integrated into the housing at the distal end of the housing. The locking system is adapted to assume: a first configuration, in which the locking system allows the coil to be positioned around and/or removed from the portion of the housing; and a second configuration, different from the first configuration, in which the locking system locks the coil around the portion of the housing.

12 Claims, 6 Drawing Sheets

(56) References Cited

U.S. PATENT DOCUMENTS

| | | | | |
|---|---|---|---|---|
| 9,181,730 | B1 * | 11/2015 | Peng | E05B 47/068 |
| 9,228,672 | B2 * | 1/2016 | Hiyama | F01L 1/3442 |
| 10,080,502 | B2 * | 9/2018 | Sano | A61B 5/0235 |
| 10,184,585 | B2 * | 1/2019 | Okada | F16K 31/0613 |
| 10,874,247 | B2 * | 12/2020 | Kelly | H01F 7/127 |

OTHER PUBLICATIONS

International Preliminary Report on Patentability for PCT/IB2022/059538 (Jan. 23, 2024).

* cited by examiner

HOUSING FOR ELECTROMAGNETIC VALVES, TUBULAR ELEMENT AND RELATED ELECTROMAGNETIC VALVE

This application is a National Stage Application of International Application No. PCT/IB2022/059538, filed Oct. 6, 2022, which claims benefit of application Ser. No. 102021000025688, filed Oct. 7, 2021 in Italy and which applications are incorporated herein by reference. To the extent appropriate, a claim of priority is made to each of the above-disclosed applications.

The present invention relates to a housing, adapted to be comprised in a tubular element for electromagnetic valves, which comprises an innovative coil locking system.

The present invention also relates to a tubular element comprising a housing according to the present invention.

The present invention further relates to an electromagnetic valve having a housing according to the present invention comprised in a tubular element assembled to the valve body.

It is known that electromagnetic valves comprise a coil adapted to move a core for controlling a shutter or diaphragm element, whether such electromagnetic valve is of the direct or indirect type. Said coil must be firmly assembled to the electromagnetic valve, so that it cannot be accidentally removed.

Several locking systems are currently known in the art. In particular, locking systems are known which are integrated into the structure or housing where the core is housed, the latter being adapted to slide within the housing. Such type of locking systems is inexpensive and easy to manufacture, but suffers from the drawback that the coil and said housing cannot be separated again once they have been coupled together. Such an implementation does not allow testing the coil and/or the electromagnetic valve to verify their proper operation prior to irremovably fixing said coil to the housing structure.

For the purposes of the present description, the expression "irremovably fixing" refers to the fact that the coupling cannot be undone without irreversibly damaging, e.g. breaking, either one of the two parts.

External locking systems are also known, which are adapted to be associated with said structure or housing, and which make it possible to selectively lock the coil in position and allow it to be subsequently removed while keeping its structural and/or functional characteristics unchanged. Such locking systems are external elements, e.g. snap rings, that can be removably coupled to said housing. Such a solution, although it permits removing the coil, if necessary, without impairing the structural integrity of either the coil or the case, or of the locking system itself, is costly because it is an element that is normally manufactured separately using a material that is more expensive than the traditional plastic materials usually employed for making such housings. Moreover, since it is an external element, it increases the production costs because an additional step is needed in order to secure the locking system to the housing.

It is also known that there is a tendency in the industry to reduce the costs and the number of parts that need to be assembled when manufacturing components for electromagnetic valves. Therefore, the current approach of the industry is not considering the possibility of easily and quickly recovering parts, particularly the coil, of the electrovalve should the latter turn out to be unsuitable for use.

It is however apparent that there is an increasing need for avoiding production rejects and speeding up the component recycling procedure.

Patent application GB2296075A discloses a valve unit comprising a first cup-shaped element made of plastic material with a base that has an external axial shank in which a longitudinal duct is formed between the seat of the pilot valve and a distal vent opening; and a second annular element of plastic material is anchored around the shank of the first element and is secured thereto by ultrasonic welding.

Patent application EP0840048A1 discloses a solenoid actuated valve having a magnetic armature slidably received in a closed guide member secured to the valve body by a spin welded ring; said armature guide has external peripheral teeth which interengage corresponding internal teeth on the solenoid coil assembly to permit any desired rotational orientation of the coil when assembled onto the guide. The coil assembly is secured in the desired rotational position by interengagement of the teeth and is secured axially by snap tabs formed on the end of the guide.

Furthermore, application FR2552582A3 discloses an actuating set for electrovalves comprising an energising element of tubular shape, with an electrical winding for control of the electrovalve, and a support made of stamped material with a profiled appendage passing through the inner cavity of the energising element and provided, at its free end, with elastic reliefs cooperating with the rim of the corresponding extreme opening of the energising element, so as to oppose the movement of extraction of the element with respect to the support; the energising element is provided with an annular groove which extends along the rim and defines a sharp ridge turned towards the inner cavity of the energising element and cooperating, by friction, with the elastic reliefs of the support.

In general, the present invention aims at solving these and other technical problems by providing a housing comprising an innovative locking system. In particular, the locking system according to the present invention combines the advantages of integrated locking systems, as concerns production and assembly costs, with the advantages offered by removable locking systems, without however being affected by the drawbacks of the latter.

One aspect of the present invention relates to a housing.

Another aspect of the present invention relates to a tubular element for electromagnetic valves.

A further aspect of the present invention relates to an electromagnetic valve.

The features and advantages of the housing, tubular element and electrovalve will become clear and apparent in light of the following description of several possible embodiments of the housing, tubular element and electrovalve, provided herein by way of non-limiting example, as well as from the annexed drawings, wherein:

FIGS. 3A and 3B show, in axonometric views, the coil and the housing according to the present invention, in two different configurations; in particular, FIG. 3A shows the coil separated from the housing according to the present invention; FIG. 3B shows the coil fitted around the housing according to the present invention;

FIGS. 4A and 4B show, in axonometric views, the coil and the housing in the configuration in which the coil is fitted around the housing with the locking system in two different configurations; in particular, FIG. 4A shows the locking system in a first configuration, in which it allows said coil to be positioned around and/or removed from said at least a portion of said housing; FIG. 4B shows the locking system in a second configuration, in which it locks said coil around said at least a portion of said housing, preventing it from being removed;

FIGS. 5A and 5B are side views of the housing with the locking system in two different configurations; in particular, FIG. 5A shows the locking system in a first configuration, in which it allows said coil to be positioned around and/or removed from said at least a portion of said housing; FIG. 5B shows the locking system in a second configuration, in which it is adapted to lock said coil around said at least a portion of said housing;

FIGS. 6A and 6B show two different magnified views of the locking system integrated into the housing; in particular, FIG. 6A shows the distal end of the housing, in which the locking system is visible, in a view from below;

With reference to the above-listed figures, reference numeral 4 designates as a whole a housing according to the present invention. Reference numeral 3 designates a tubular element for electromagnetic valves according to the present invention. Lastly, reference numeral 1 designates as a whole an electromagnetic valve according to the present invention.

Housing 4 according to the present invention is particularly suitable for use in electromagnetic valves 1. Said housing 4 is adapted to internally receive a core 12. Said housing 4 allows said core 12 to slide therein for switching said electromagnetic valve 1.

At least a portion of said housing 4 is adapted to be surrounded by a coil 11 comprised in electromagnetic valve 1.

Said housing 4 according to the present invention extends along an axis "L". Said housing 4 according to the present invention comprises a distal end 41A and an open proximal end 41B.

Housing 4 according to the present invention comprises a locking system 44 adapted to lock said coil 11. Said locking system 44 is integrated into said housing 4. Said locking system 44 is, advantageously, located at distal end 41A of said housing 4.

Said locking system 44 is adapted to assume at least a first configuration and a second configuration. In said first configuration, said locking system 44 allows said coil 11 to be positioned around and/or removed from said at least a portion of said housing 4. In said second configuration, different from said first configuration, said locking system 44 locks said coil 11 around said at least a portion of said housing 4, in particular preventing the removal and/or insertion thereof.

The present solution makes it possible to replace coil 11 easily and quickly in case of need. In particular, the present solution makes it possible to selectively remove or position said coil 11 around said housing, so that the coil itself and/or electrovalve 1 in which it is included can be tested prior to locking said coil 11 around at least a portion of said housing 4. Moreover, the present solution allows said coil 11 to be easily and quickly recovered in the event that said housing 4 has some structural defects.

For the purposes of the present description, locking said coil 11 means that said coil 11 cannot be subsequently separated from said housing 4, unless said locking system 44 is returned into said first configuration and/or said locking system 4 is broken, in which case it cannot be reused.

Figure 3A:
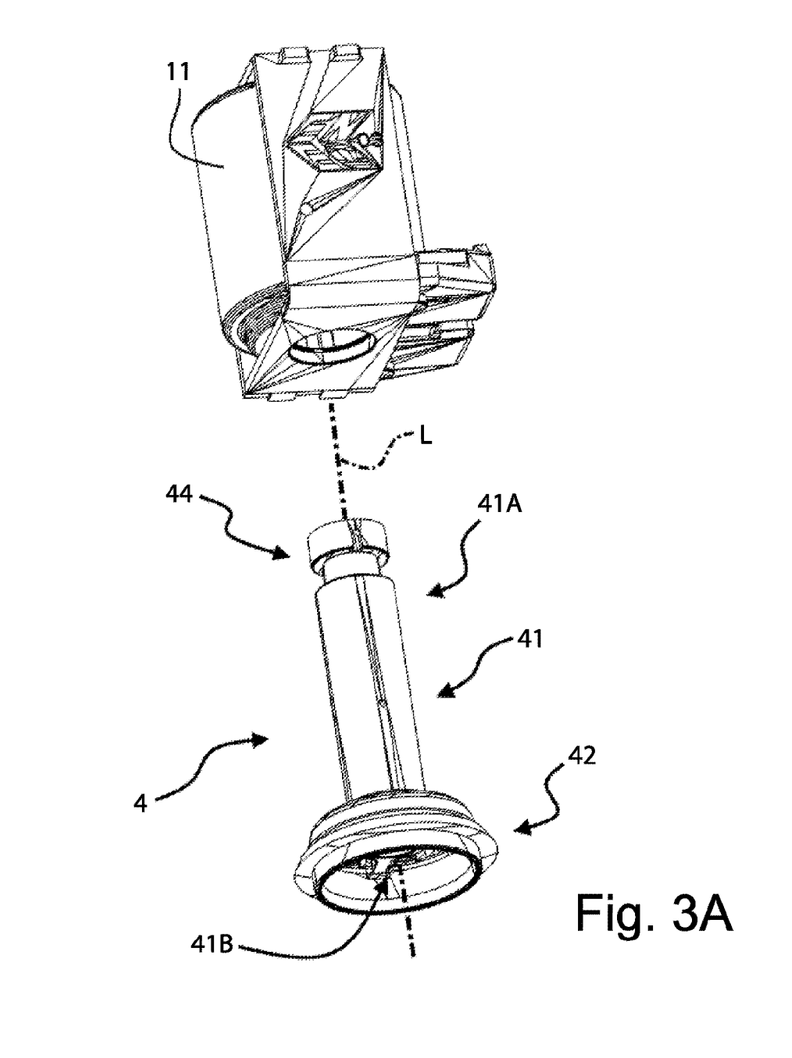
Figure 3B:
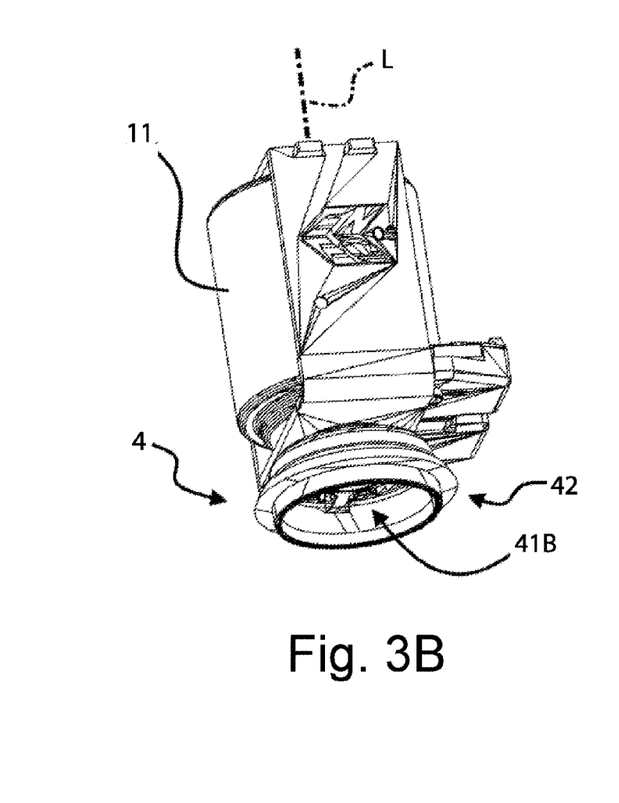

Housing 4 according to the present invention can thus be selectively coupled to a coil 11. FIGS. 3A and 3B show one possible, but merely illustrative and non-limiting, embodiment of a coil and a housing according to the present invention in two different configurations. In particular, FIG. 3A shows coil 11 separated from housing 4 according to the present invention. In FIG. 3A one can see that coil 11 has a substantially cylindrical shape that defines a through hole into which said housing 4 can be at least partially inserted, in particular by inserting distal end 41A of housing 4, particularly of cylindrical portion 41 thereof. FIG. 3A shows other construction details of one possible, but merely illustrative and non-limiting, embodiment of housing 4, which will be further described below. In particular, said housing 4 extends along an axis "L" and comprises a cylindrical portion 41 having a distal end 41A, preferably closed, and a proximal end 41B, preferably open. Said housing 4 further comprises a sealing portion 42, which is adapted to cooperate with a sealing element (14, 16) comprised in electromagnetic valve 1. Said sealing portion 42 is located at proximal end 41B of cylindrical portion 41.

FIG. 3A also shows one possible embodiment of locking system 44, which is integrated into said housing 4. In the illustrated embodiment, said locking system 44 is located at distal end 41A of said housing 4.

For the purposes of the present description, the phrase "locking system 44 integrated into said housing 4" means that said locking system 44 is part of housing 4, since it cannot be separated from the latter without breaking and/or impairing the function of either component.

FIG. 3B shows coil 11 fitted around housing 4 according to the present invention. In FIG. 3B one can see that a portion of housing 4, in particular the cylindrical portion, has been inserted into the through hole of coil 11 up to its proximal end 41B. In the illustrated embodiment, said coil 11 has been slid along said axis "L" until it has come in abutment with sealing portion 42 of housing 4.

More generally, in housing 4 according to the present invention said locking system 44 is adapted to assume a first configuration, in which it allows said coil 11 to be positioned around and/or removed from said at least a portion of said housing 4.

Figure 4A:
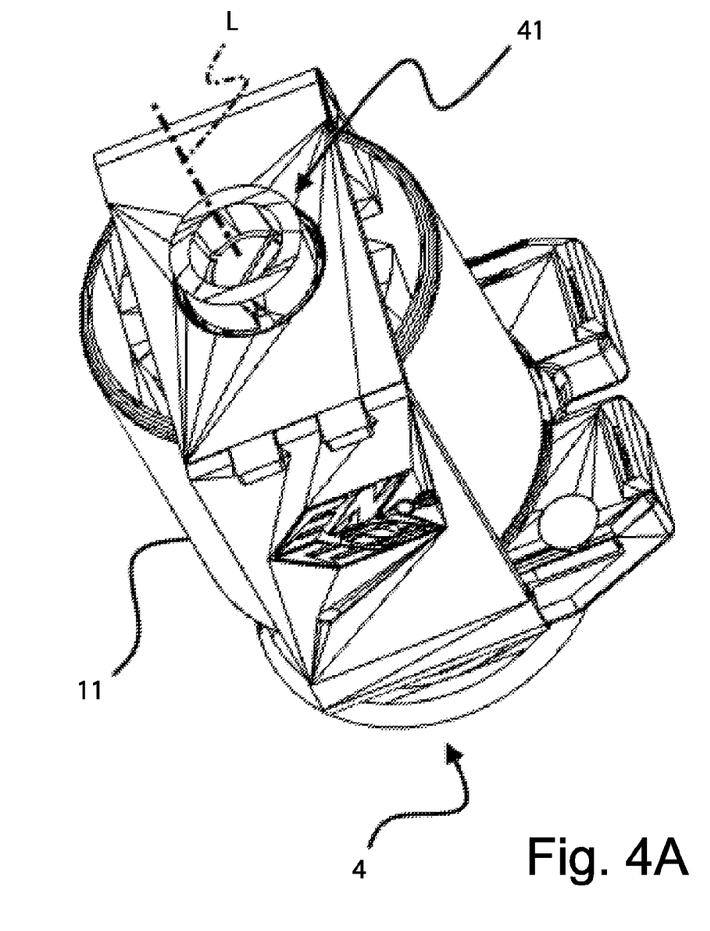

In this respect, FIG. 4A shows, by way of non-limiting example, one possible embodiment of coil 11 and of housing 4 according to the present invention in which said coil 11 is positioned around said housing 4 and locking system 44 is in a first configuration. In such configuration, locking system 44 allows said coil 11 to be positioned around and/or removed from said at least a portion of said housing 4 an infinite number of times. In particular, said coil 11 can be positioned or removed by, for example, sliding it along said axis "L".

In the embodiment illustrated in FIG. 4A, one can see that said locking system 44 protrudes past coil 11 along said axis "L", in particular when said coil 11 has come in abutment with the sealing portion of housing 4.

More generally, said locking system 44 of housing 4 according to the present invention is adapted to assume a second configuration, different from said first configuration, in which it locks said coil 11 once it has been positioned around said at least a portion of said housing 4 and/or prevents it from being fitted around said housing. In this configuration of locking system 44, coil 11 cannot be separated from said housing 4.

Figure 4B:
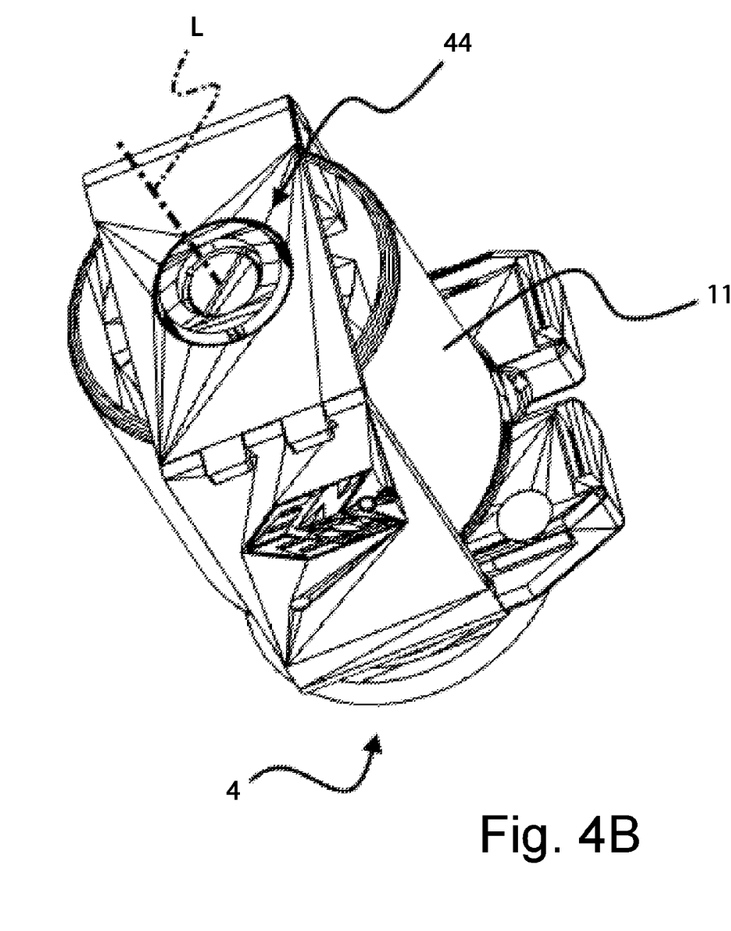

In this respect, FIG. 4B shows, by way of non-limiting example, one possible embodiment of locking system 44 in a second configuration, in which said locking system 44 locks said coil 11 around said at least a portion of said housing 4, preventing it from being separated.

In the illustrated embodiment, said second configuration differs from said first configuration from both a functional viewpoint and a mechanical/structural viewpoint. This becomes apparent when comparing it with FIG. 4A, wherein said locking system 44 is in said first configuration. In particular, the embodiment of locking system 4 illustrated in FIG. 4B acts upon an end of coil 11, in particular upon that end which is opposite the end of coil 11 that abuts against said sealing portion of housing 4.

More generally, the following will describe some other features of housing 4 according to the present invention and some possible embodiments thereof, wherein said locking system 44 is made, in a preferred embodiment thereof, as one piece with said housing 4.

For the purposes of the present description, "made as one piece" refers to the fact that said locking system 44 is formed in the body of said housing 4. Therefore, said locking system 44 is not a separate body distinct from said housing 4.

The present embodiment, wherein locking system 44 is formed in the body of said housing 4, avoids having to assemble locking system 44 to housing 4.

In an even more preferable embodiment of housing 4 according to the present invention, said locking system 44 and said housing 4 are a monolithic body.

For the purposes of the present description, the term monolithic body means that said locking system 44 and said housing 4 are formed in the same body, e.g. during the same production process, e.g. a moulding process.

The present embodiment, wherein locking system 44 and housing 4 are a monolithic body, permits speeding up the production of housing 4 according to the present invention, resulting in higher productivity and lower costs incurred for manufacturing housing 4.

As aforementioned, said locking system 44 is adapted to assume at least two distinct configurations, in particular: a first configuration, in which it allows said coil 11 to be positioned around and/or removed from said at least a portion of housing 4; and a second configuration, different from said first configuration, in which it locks said coil 11 around said at least a portion of housing 4, in particular around said cylindrical portion 41.

In one possible embodiment, said locking system 44 is reversible and allows switching from one configuration to the other. The present embodiment permits switching from the first configuration to the second configuration, and then returning into the first configuration, preferably while keeping the characteristics of locking system 44 unchanged. The present embodiment permits recovering said housing 4 and/or said coil 11 should either one of such two parts be defective or malfunctioning, so that the other part can be reused.

In another possible embodiment, said locking system 44 is non-reversible, i.e. said locking system 44 is designed to prevent, once said second configuration has been assumed, returning to said first configuration. Such an embodiment is easy to manufacture and inexpensive.

Describing the construction details of some possible embodiments of housing 4, in one possible embodiment of housing 4 according to the present invention said housing 4 has a body 40, which defines at least said cylindrical portion 41. In the present embodiment, said locking system 44 is integrated into the distal end of cylindrical portion 41 of body 40 of housing 4. Said locking system 44 is adapted to lock coil 11, comprised in electromagnetic valve 1, around cylindrical portion 41 of housing 4.

In one possible, but merely illustrative and non-limiting, embodiment, said locking system 44 has, in said first configuration, an outside diameter "D" of a known value, allowing said coil 11 to be positioned around and/or removed from cylindrical portion 41. In the same embodiment, said locking system 44 has, in said second configuration, an outside diameter "D" which is greater than said known value, thus locking said coil 11 around cylindrical portion 41 of housing 4.

Describing now in more detail the construction of a preferred embodiment of housing 4 according to the present invention, said housing 4 comprises: a cylindrical portion 41 and a sealing portion 42, which, for example, define said body 40.

More particularly, said cylindrical portion 41 has a known outside diameter "d". Said cylindrical portion 41 extends, as aforementioned, along said axis "L". Even more specifically, said cylindrical portion 41 comprises a distal end 41A, preferably closed, and a proximal end 41B, the latter being open. Preferably, said distal end 41A of cylindrical portion 41 is closed.

Said sealing portion 42 of housing 4 is adapted to cooperate with a sealing element (14, 16) comprised in electromagnetic valve 1.

For the purposes of the present description, "to cooperate" means that said sealing portion 42 interacts, whether directly or indirectly, with a sealing element, such as, for example, a diaphragm 14 or a shutter 16, to ensure the proper operation of electromagnetic valve 1 when the latter is switched.

Said sealing portion 42 of housing 4 is arranged at the open proximal end 41B of cylindrical portion 41. Preferably, said sealing portion 42 is made as one monolithic piece together with said cylindrical portion 41, preferably defining said body 40.

In a preferred embodiment, said locking system 44 is made as one piece with said cylindrical portion 41 of housing 4.

Describing now in more detail the construction of one possible embodiment of housing 4, said housing 4 comprises a body 40, preferably a monolithic one. Said body 40 of the housing 4 comprises said cylindrical portion 41 and said sealing portion 42. Preferably, said cylindrical portion 41 has a closed distal end 41A and an open proximal end 41B.

More generally, distal end 41A of housing 4, in particular of cylindrical portion 41, is that end of housing 4 which is farthest from a valve body 2 when said housing 4, or tubular element 3, is assembled to valve body 2 of an electromagnetic valve 1. Said proximal end 41B of housing 4, in particular of cylindrical portion 41, is that end of housing 4 which is closest to valve body 2 when said housing 4, or tubular element 3, is assembled to valve body 2.

In a preferred, but merely illustrative and non-limiting, embodiment in which said electromagnetic valve 1 is an indirect valve, said sealing portion 42 is adapted to act, even only partly, upon a diaphragm element 14, the latter being adapted to be arranged in a seat defined by said sealing portion 42, in connection with said sealing portion 42. In such an embodiment, said sealing portion 42 advantageously has a circular profile defining a dome-shaped structure that joins said cylindrical portion 41 of housing 4. This embodiment facilitates assembling housing 4 and diaphragm element 14 to valve body 2 of electrovalve 1.

In the embodiment in which said electromagnetic valve 1 is a direct valve, said sealing portion 42 is adapted to define at least one stopper element of a shutter 16.

More generally, said sealing portion 42 is located at the open proximal end of cylindrical portion 41. Preferably, said sealing portion 42 has a tapered shape, e.g. a dome-like shape.

In a preferred embodiment of housing 4 according to the present invention, said locking system 44 has, in said first configuration, an outside diameter "D" of a known value. In the same embodiment, said locking system 44 has, in said second configuration, an outside diameter "D" which is greater than said known value.

The present embodiment permits changing the diameter of said locking system 44 when switching from said first configuration to said second configuration, so as to eliminate the possibility of removing coil 11 once it has been positioned around said housing 4.

More generally, the increased outside diameter "D" of locking system 44 can interact with said coil 11, preventing its removal, at one end of said coil 11, as in the embodiments illustrated herein, and/or in a central portion of the structure of said coil 11.

Preferably, when it is in the first configuration, said locking system 44 maintains said known outside diameter "D" as said coil 11 is positioned around said housing 4 and also as said coil 11 is removed from said housing 4.

In a preferred embodiment of the locking system 44, the variation, in particular the increase, in outside diameter "D" of said locking system 44 when switching from said first configuration to said second configuration and, depending on the embodiment, vice versa, is due to a stable variation that occurs in the structure of locking system 44.

For the purposes of the present description, the term "stable variation" refers to a variation that is permanent over time, excluding any a stable variation, e.g. a temporary deformation caused by the movement made for coupling housing 4 with coil 11, e.g. during the movements along axis "L".

In a preferred embodiment of housing 4 according to the present invention, said locking system 44 is designed in such a way that, once said second configuration has been assumed, it will be impossible to said first configuration again. In the present embodiment, locking system 44 undergoes, for example, a plastic deformation, in particular an irreversible deformation.

For the purposes of the present description, an "irreversible deformation" is a deformation that does not permit returning to the previous configuration without causing locking system 44 to break or lose its functionality.

In an alternative, but merely illustrative and non-limiting, embodiment, said locking system 44 is designed to allow switching between said second configuration and said first configuration, and vice versa, preferably at least once. In the present embodiment, the switching between configurations is reversible.

In a preferred, but merely illustrative and non-limiting, embodiment of housing 4 according to the present invention, said locking system 44 comprises: at least one body 440 having a cylindrical shape; at least one first yielding portion 442 and at least one second yielding portion 444.

More particularly, said at least one first yielding portion 442 is adapted to allow a movement of said body 440 along said axis "L" at least while switching from the first configuration to said second configuration of the locking system 44.

Preferably, said at least one second yielding portion 444 is adapted to allow increasing an outside diameter "D" of locking system 44 once it has assumed said second configuration.

With the present embodiment, said locking system 44 can be selectively made to assume at least two possible values of outside diameter "D", different from each other. In the present embodiment, outside diameter "D" assumed in said first configuration of locking system 44 is smaller than outside diameter "D" assumed in said second configuration.

In a preferred embodiment of locking system 44 of housing 4 according to the present invention, a gripping element 441 is comprised which is located at distal end 41A of housing 4. In particular, said gripping element 441 is adapted to interact with said body 440 in order to change the diameter of locking system 44. In the same embodiment, said first yielding portion 442 connects said body 440 mechanically to said gripping element 441. For example, said yielding portion 442 is a portion adapted to become elastically deformed; or said yielding portion 442 is a breaking point, preferably a fracture portion, being adapted to be fractured to allow a movement of said body 440 along said axis "L". Preferably, said second yielding portion 444 is formed in body 440 and allows said body 440 to undergo a deformation that increases its outside diameter "D" as it interacts with said gripping element 441. For example, said second yielding portion 444 is adapted to become elastically deformed; or said second yielding portion 444 is a breaking point, being adapted to be fractured in order to weaken the structure of body 440 and allow said body 440 to undergo a deformation that increases its outside diameter "D" as it interacts with said gripping element 441.

In a preferred embodiment, said gripping element 441 is a protrusion that, in the first configuration of locking system 44, is connected to body 440 through said first yielding portion 442. In the second configuration of locking system 44, the same gripping element 441 interacts with said body 440 by interference, e.g. by friction, in order to prevent the separation thereof.

In the preferred embodiment, when switching between said first configuration and said second configuration of locking system 44, said first yielding portion 442 is adapted to be fractured, thus allowing said body 440 to move relative to said gripping element 441. Preferably, said body 440 comprises an annular portion. At the same time, said second yielding portion 444 is adapted to become deformed, preferably by fracturing, thus allowing said body 440 to increase its outside diameter "D", in particular the diameter of said annular portion, so that it can interact with said gripping element 441 by surrounding it at least partially. The interaction between said body 440 and said gripping element 441 is such that it allows said body 440 to deform, thereby increasing its outside diameter "D", while at the same time interacting by interference, e.g. by friction, so as to prevent the separation of said body 440 once said second configuration of locking system 44 has been reached.

Preferably, in order to switch from the first configuration to the second configuration of locking system 44 it is sufficient to exert a force on said locking system 44, e.g. a thrust force on said body 440, along said axis "L" towards proximal end 41B of housing 4. Such force is, for example, adapted to fracture said first yielding portion 442 and deform the second yielding portion 444, fracturing it at least partially, so that body 440, as it interacts with said gripping element 441, will increase its own outside diameter "D" and interact by interference with said gripping element 441, thus ensuring that coil 11 will be locked around said housing 4.

Figure 5A:
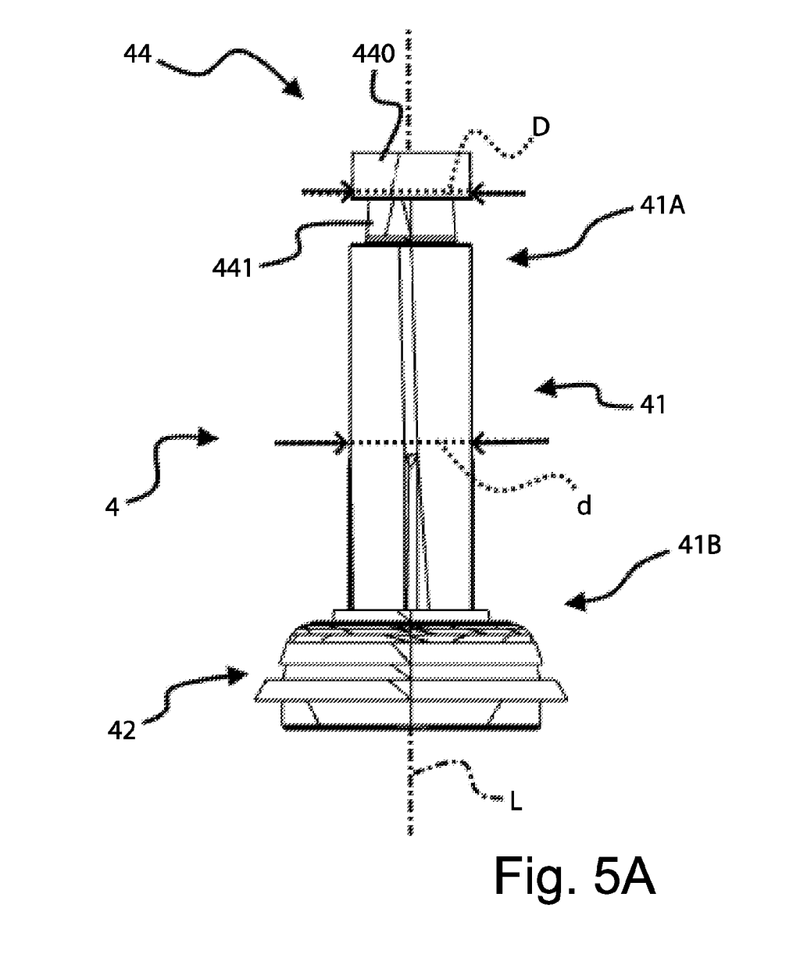

FIG. 5A shows a side view of one possible embodiment of housing 4, which comprises a locking system 44 according to one possible, but merely illustrative and non-limiting, embodiment thereof. Locking system 44 illustrated in FIG. 5A is in the first configuration, in which it allows said coil 11 to be positioned around and/or removed from said at least a portion of said housing 4. The drawing shows said housing 4 as comprising a cylindrical portion 41 having a second end 41B from which said dome-shaped sealing portion 42 extends. Said cylindrical portion 41 has a known outside diameter "d". At distal end 41A there is said locking system 44, which has a known outside diameter "D" that is substantially similar to outside diameter "d" of the cylindrical portion 41. Said housing 4 extends along said axis "L". In the illustrated embodiment of locking system 44, body 440 and gripping element 441 are visible.

Figure 5B:
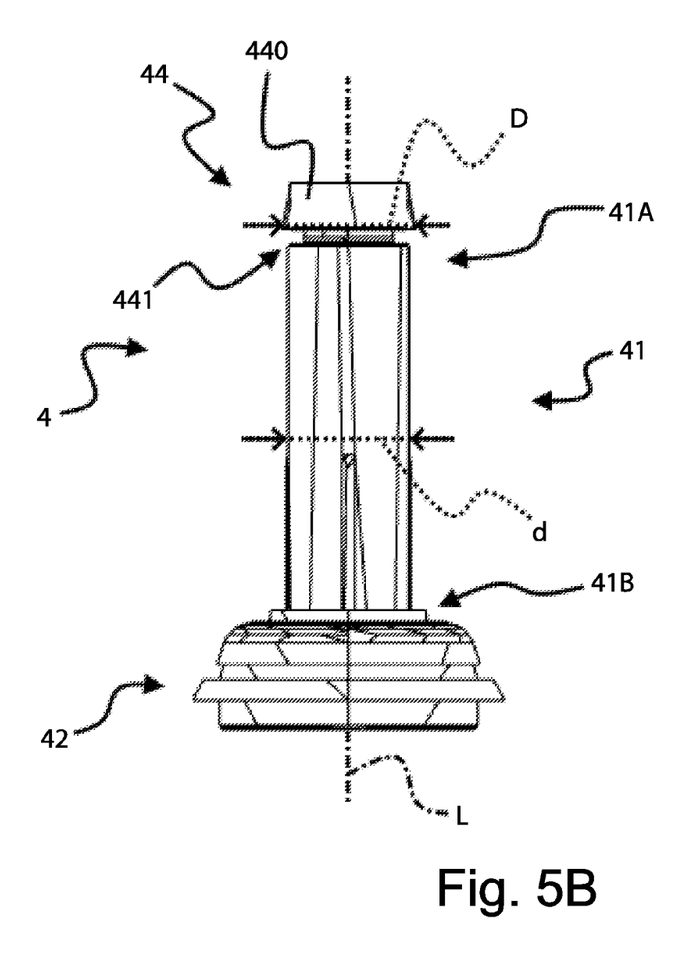

FIG. 5B shows housing 4 of FIG. 5A, wherein locking system 44 has reached said second configuration. In such second configuration, said locking system 44 is adapted to lock a coil 11 fitted around said at least a portion of said housing 4. In this figure one can see that body 440 has interacted with the gripping element, located at distal end 41A, in order to change outside diameter "D" of said body 440. As shown in the drawing, outside diameter "D" of locking system 44 is greater than outside diameter "d" of cylindrical portion 41 of housing 4.

Figure 6A:
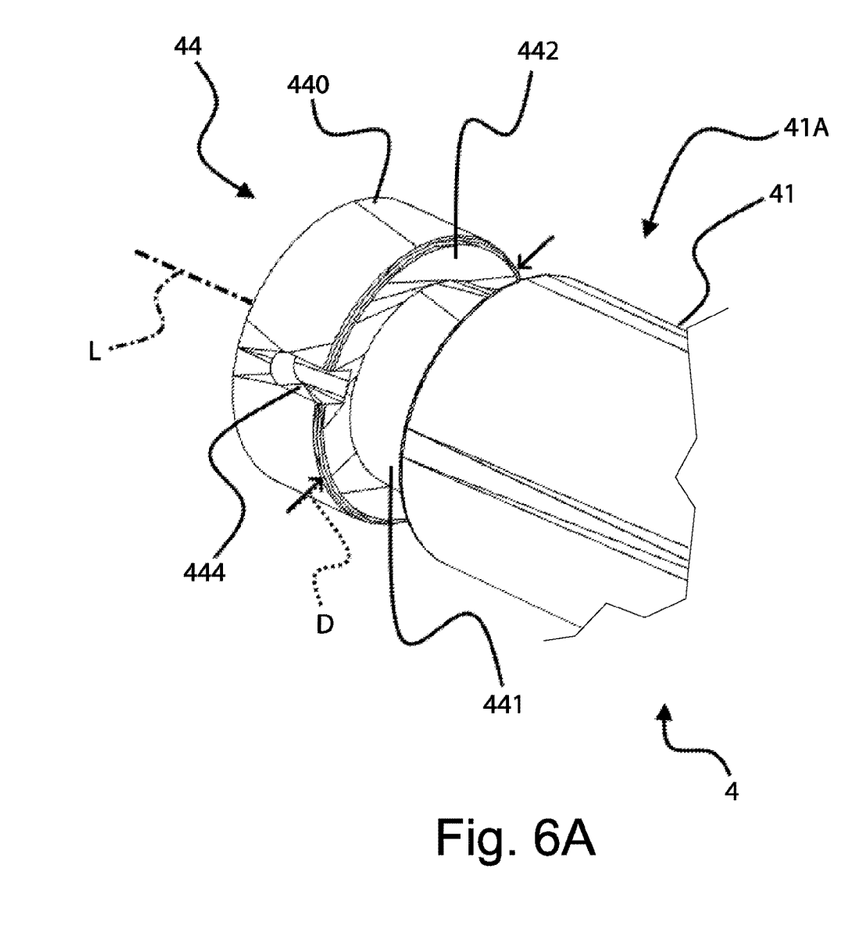

FIG. 6A shows a magnified view of distal end 41A of housing 4, wherein said locking system 44 is visible from below, locking system 44 being in particular in its first configuration. This figure shows the shape of both the first yielding portion 442 and the second yielding portion 444. In particular, from this figure one can understand how said first yielding portion 442 connects said body 440 mechanically to said gripping element 441. Furthermore, the drawing shows how said second yielding portion 444 allows body 440 to undergo a deformation that increases its outside diameter "D" as it interacts with said gripping element 441. The drawing shows that said body 440 has an annular structure and said gripping element 441 is substantially a cylindrical or frustoconical protrusion adapted to interfere with the annular structure of body 440 in the second configuration of locking system 44.

Figure 6B:
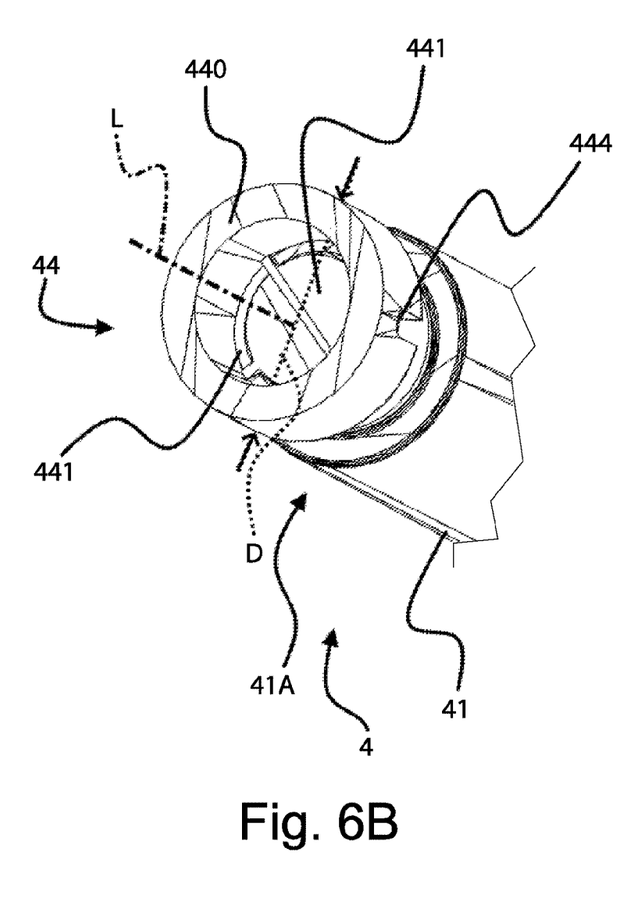
FIG. 6B shows the distal end of the housing, in which the locking system is visible, in a view from above.

FIG. 6B shows distal end 41A of housing 4 in a view from above. This figure shows said locking system 44 and the annular structure of body 440, which is mechanically connected to gripping element 441 through said first yielding portion 442. Said second yielding portion 444 is also visible in the drawing, which allows body 440 to undergo a deformation that increases its outside diameter "D" as it interacts with gripping element 441.

Figure 1:
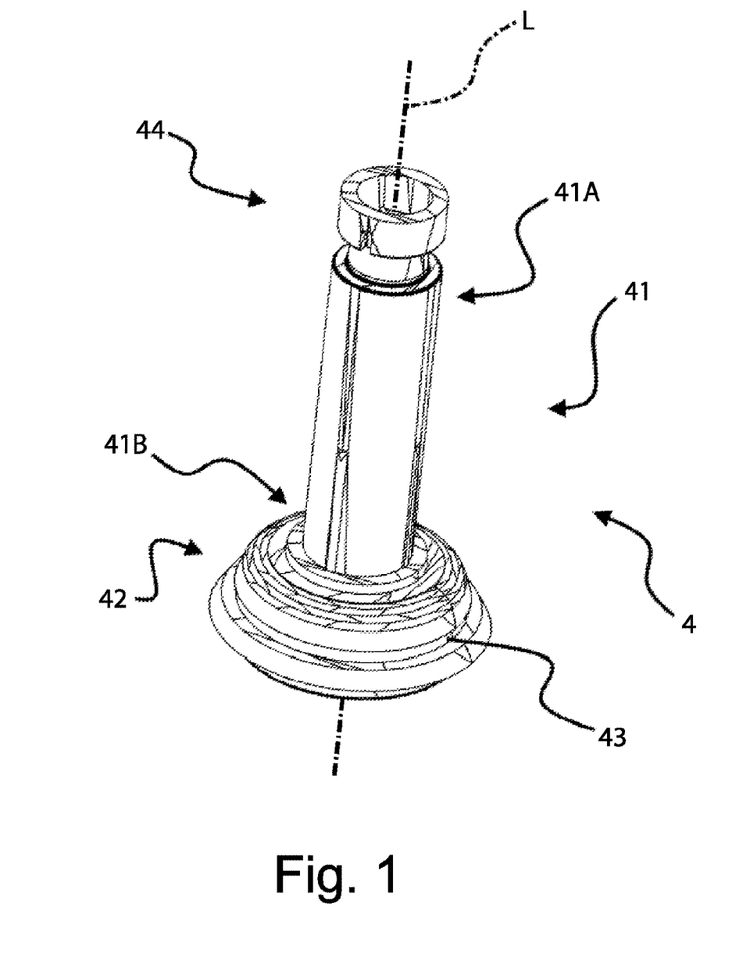
FIG. 1 shows an axonometric view of one possible embodiment of a housing according to the present invention, which comprises a locking system according to the present invention.

Last but not least, FIG. 1 shows an axonometric view of a housing 4 according to the present invention. In the embodiment shown in FIG. 1, said housing 4 comprises a locking system 44 according to the present invention in one possible, but merely illustrative and non-limiting, embodiment thereof, in particular in the embodiment illustrated in the other figures attached hereto.

As aforementioned, housing 4 according to the present invention is particularly suitable for being included in a tubular element 3 according to the present invention.

Said tubular element 3 comprises, in addition to said housing 4, a connection portion 5.

Said housing 4 and said connection portion 5 of tubular element 3 may be made either as one piece or as two distinct elements or bodies (40, 50) adapted to be assembled together.

In one possible embodiment of said tubular element 3 according to the present invention, said tubular element 3 is monolithic, being made as one piece.

In another possible embodiment of tubular element 3 according to the present invention, said housing 4 has a body 40 which is separate from and independent of said connection portion 5, the latter having in turn a body 50. In such an embodiment, said body 40 of said housing 4 is removably connectable to said body 50 of connection portion 5, thereby forming an assembly. The present solution permits making said tubular element 3 from two bodies that can be removably connected to each other. Moreover, the present solution permits recovering at least one of the two bodies (40, 50) of tubular element 3 in case said tubular element 3 and/or electromagnetic valve 1 is not fully compliant with the specifications and must therefore be discarded. The present solution permits reusing at least one body (40, 50) in another assembly of said tubular element 3 to be assembled to another valve body 2. In the present embodiment, said housing 4 and said connection portion 5 are not merely two independent elements, but are advantageously adapted to interact with each other, becoming an assembly even when tubular element 3 is a separate part not yet assembled to valve body 2.

In a preferred, but merely illustrative and non-limiting, embodiment, said sealing portion 42 of housing 4 comprises connection means 43. Said connection means 43 are adapted to removably connect housing 4, e.g. its body 40, to body 50 of connection portion 5. Such connection means 43 make it possible to connect, in a removable manner, said body 50 of connection portion 5 to said body 40 of housing 4.

More generally, said tubular element 3 according to the present invention is particularly suitable for application to electromagnetic valves 1. Said tubular element 3 is particularly suitable for being assembled to a valve body 2 comprised in an electromagnetic valve 1. As aforementioned, tubular element 3 according to the present invention comprises a connection portion 5 adapted to be removably fastened to said valve body 2 for assembling tubular element 3 to valve body 2.

In a preferred embodiment of said connection portion 5, and in particular of body 50, it is adapted to be fastened to valve body 2 by means of an at least partly rotational movement. In one possible embodiment, said body 50 of connection portion 5 has an annular structure.

More generally, the connection of connection portion 5 to valve body 2 or, generally, of tubular element 3 to valve body 2, by means of an at least partly rotational movement can be achieved by means of a bayonet connection or by means of threaded portions or other connection systems comprising at least one at least partly rotational movement.

In a preferred embodiment of tubular element 3 according to the present invention, the removable connection between said body 40 of housing 4 and body 50 of connection portion 5 is such that the movements imparted to connection portion 5 will not jeopardize the proper operation of one or more sealing elements (14, 16), in particular diaphragm elements 14, comprised in valve body 2.

In an even more preferable embodiment, the removable connection between said body 40 of housing 4 and body 50 of connection portion 5 is such that at least the rotational component of a movement of said body 50 of connection portion 5, necessary for removably fastening tubular element 3 to valve body 2, is not transmitted to body 40 of said housing 4.

In a preferred embodiment of tubular element 3 according to the present invention, said body 50 of connection portion 5 comprises a threaded portion 51. Said threaded portion 51 is located on the outer edge of the structure, e.g. an annular structure, of the same body 50. In such an embodiment, connection portion 5 permits fastening tubular element 3 onto valve body 2 by screwing said connection portion 5.

In another possible embodiment of said connection portion 5, particularly of body 50, it is adapted to be interlocked with valve body 2 by means of a linear movement, e.g. along the axis "L".

Describing now in more detail the construction of a preferred, though merely illustrative and non-limiting, embodiment of tubular element 3 according to the present invention, body 50 of connection portion 5 defines gripping elements 52. Said gripping elements 52 are adapted to allow imparting the at least partly rotational movement to connection portion 5 for removably fixing tubular element 3 to valve body 2.

Preferably, said gripping elements 52 make it possible to screw said connection portion 5 onto valve body 2 in order to assemble tubular element 3 to said valve body 2.

Describing now a preferred embodiment in more detail, said gripping elements 52 are slots, e.g. through slots, formed in body 50 of connection portion 5, in particular arranged radially, which facilitate the exertion, e.g. by means of a tool, of a force on said gripping elements 52 to impart a rotational movement to said connection portion 5.

Figure 2:
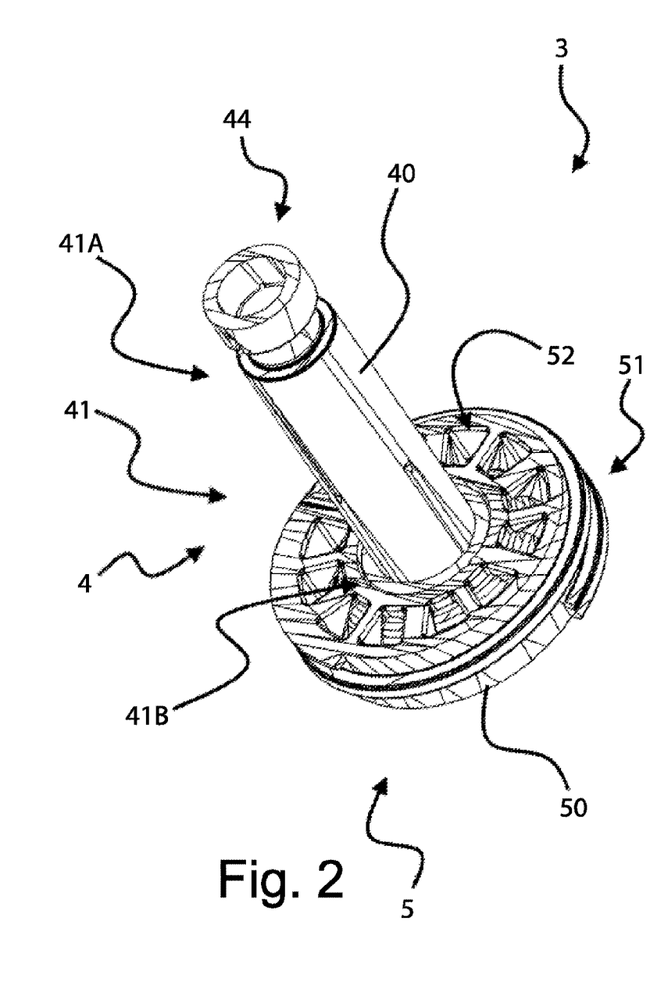
FIG. 2 shows an axonometric view of one possible embodiment of a tubular element according to the present invention, which comprises a locking system according to the present invention.

FIG. 2 shows a perspective view of one possible, though merely illustrative and non-limiting, embodiment of tubular element 3 according to the present invention. In this figure one can see that connection portion 5 has a body 50, on the outer edge of which there is a threaded portion 51. Said body 50 comprises also a plurality of gripping elements 52, in the form of through holes disposed radially.

The figure also shows further construction details of body 40 of housing 4, particularly of cylindrical portion 41. At distal end 41A of cylindrical portion 41 locking system 44 is comprised, which is integrated into body 40 of housing 4.

Tubular element 3 according to the present invention is particularly suitable for being comprised in an electromagnetic valve 1 for household appliances.

Tubular element 3, more specifically housing 4, is particularly suitable for being included in an electromagnetic device, preferably comprised in a household appliance, e.g. washing machines, dishwashers, refrigerators, ovens, etc., or in components and/or devices adapted for use in such household appliances, in accordance with the present invention. Said electromagnetic device is, for example, a pump, a switching valve, etc.

In the following part of the present description, reference will be made to an electromagnetic valve 1, but the concepts and/or components comprised and described therein may also be applicable, wherever appropriate, to a generic electromagnetic device.

Electromagnetic valve 1 comprises: a valve body 2 having: at least one inlet 21; at least one outlet 23; and at least one connection tract 22 adapted to hydraulically connect said at least one inlet 21 to said at least one outlet 23.

Electromagnetic valve 1 further comprises a sealing element (14, 16). Said sealing element is arranged in a seat 221 formed in said connection tract 22, and is adapted to selectively allow a flow of fluid between said inlet 21 and said outlet 23 of valve body 2.

Said tubular element 3 comprised in electromagnetic valve 1 is adapted to be removably connected to said valve body 2 while ensuring hydraulic tightness in cooperation with said sealing element (14, 16).

Electromagnetic valve 1 further comprises a core 12 adapted to slide within tubular element 3, in particular within said housing 4, and to cooperate with said sealing element (14, 16) for selectively allowing a flow of fluid between said at least one inlet 21 and said at least one outlet 23 of valve body 2. Electromagnetic valve 1 comprises also a coil 11, arranged around said tubular element 3, in particular around said housing 4, which is adapted to generate a magnetic field capable of selectively moving said core 12.

In one possible embodiment, said electromagnetic valve 1 according to the present invention is a direct valve.

In another possible embodiment, said electromagnetic valve 1 according to the present invention is an indirect valve.

Said electromagnetic valve 1 is in turn particularly suitable for use in household appliances such as, for example, washing machines, dishwashers, refrigerators, ovens, etc., or in components and/or devices adapted for use in such household appliances.

Describing now the construction of said valve body 2 in more detail, said at least one inlet 21 is adapted to be connected to a supply duct, e.g. the water mains. Said at least one outlet 23 is adapted to be connected to a duct of a downstream circuit. Said at least one connection tract 22 is adapted to hydraulically connect said at least one inlet 21 to said at least one outlet 23.

More generally, said valve body 2 may be the structure of an individual electromagnetic valve 1, or may be incorporated into another device or in a circuit, e.g. a water softener, a regeneration circuit, etc.

Said core 12, comprised in electromagnetic valve 1, may be made of ferromagnetic material or composite material or any other material suitable to interact with electromagnetic fields generated by said coil 11. Said core 12 is adapted to slide within tubular element 3 and cooperate with a sealing element (14, 16), whether directly or indirectly, in order to selectively allow a flow of fluid between said at least one inlet 21 and said at least one outlet 23 of valve body 2.

As aforementioned, said electromagnetic valve 1 comprises a coil 11. Said coil 11 is arranged around said tubular element 3, in particular around said housing 4. Said coil 11 is adapted to generate a magnetic field capable of selectively moving said core 12.

Within tubular element 3, in particular within housing 4, an elastic element, e.g. a spring, preferably a coil spring, may be advantageously positioned to allow said core 12 to return into a predetermined position following the action of the magnetic field generated by said coil 11.

In one possible embodiment, said electromagnetic valve 1 according to the present invention is an indirect valve. In the present embodiment, it also comprises at least one diaphragm element 14, placed in a seat 221 formed in said connection tract 22. Said diaphragm element 14 is adapted to selectively allow a flow of fluid between said at least one inlet 21 and said at least one outlet 23 of valve body 2.

Figure 7:
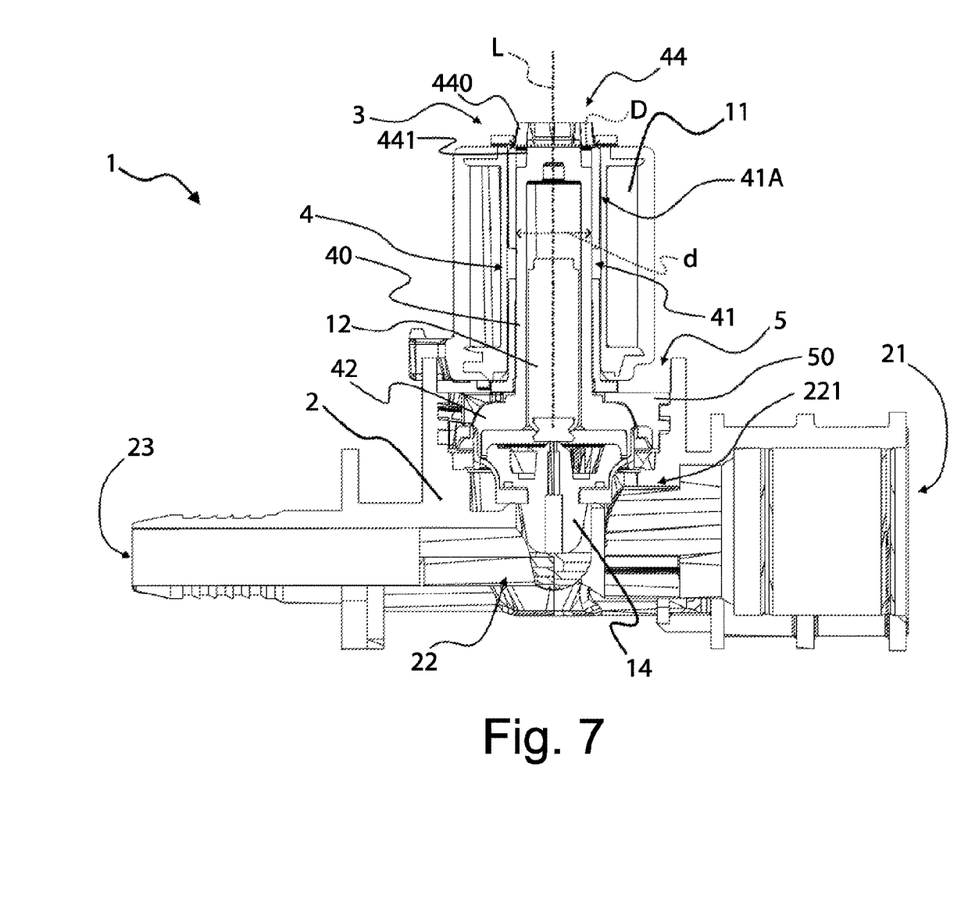
FIG. 7 shows an indirect electrovalve comprising a housing of a tubular element according to the present invention.

FIG. 7 shows, in a sectional view relative to a vertical plane, one possible embodiment of an electromagnetic valve 1 according to the present invention, comprising a tubular element 3 according to the present invention. In this figure one can see a valve body 2 having at least one inlet 21, at least one outlet 23, and a connection tract 22, the latter hydraulically connecting said at least one inlet 21 to said at least one outlet 23.

Said connection tract 22 comprises a seat 221, e.g. formed in its structure, in which a diaphragm element 14 is positioned.

Said tubular element 3 according to the present invention is placed on top of said diaphragm element 14. Said diaphragm interacts with said sealing portion 42 of housing 4. Said tubular element 3 is removably connected, in particular screwed, to said valve body 2, thus ensuring hydraulic tightness, in particular in cooperation with said diaphragm element 14.

In the illustrated embodiment, said tubular element 3 comprises a housing 4 and a connection portion 5, wherein said housing 4 has a body 40 which is distinct from and independent of body 50 of connection portion 5. Said connection portion 5 is removably fastened to valve body 2 when tubular element 3 is assembled to said valve body 2.

In the illustrated embodiment, body 40 of housing 4 comprises: a cylindrical portion 41 having a closed distal end and an open proximal end; and a sealing portion 42, which acts upon diaphragm element 14.

Said housing 4 internally houses a core 12, which is adapted to slide within said cylindrical portion 41. Said core 12 cooperates with said diaphragm element 14 to selectively allow a flow of fluid between inlet 21 and outlet 23 of valve body 2.

In the illustrated embodiment, a coil 11 is arranged around tubular element 3, in particular around said cylindrical portion 41 of housing 4, which coil 11 can generate a magnetic field capable of selectively moving core 12.

At distal end 41A of housing 4 there is a locking system 44, which is shown to be in the second configuration, thus locking said coil 11 around cylindrical portion 41 of said housing 4.

In the illustrated embodiment body 440 of locking system 44 is visible which, by interacting with said gripping element 441, has undergone a deformation that has increased its outside diameter "D". From this figure one can infer that outside diameter "D" of body 440 of locking system 44 is greater than outside diameter "d" of cylindrical portion 41 of housing 4.

In another possible embodiment, said electromagnetic valve 1 according to the present invention is a direct valve.

The features and the principle of operation of a direct valve and an indirect valve will not be described any further herein, since they are per se known to a person skilled in the art.

Figure 8:
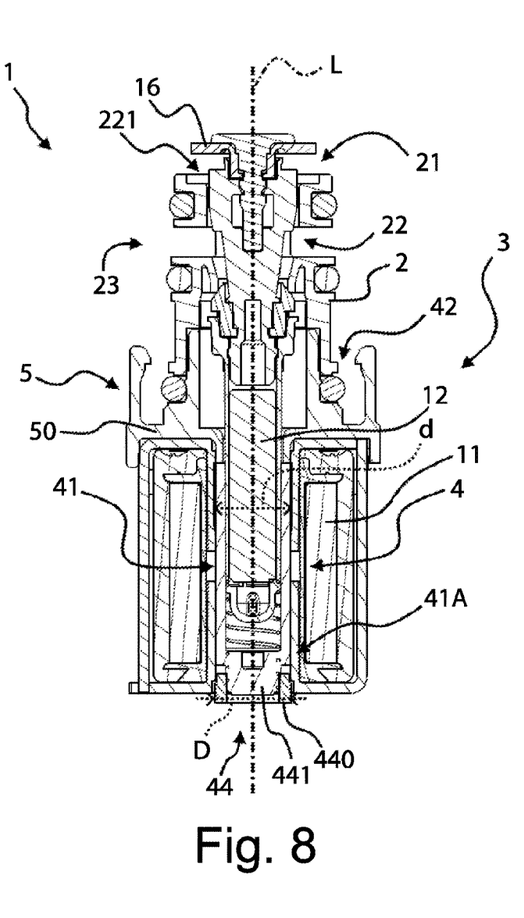
FIG. 8 shows a direct electrovalve comprising a housing of a tubular element according to the present invention.

FIG. 8 shows, in a sectional view relative to a vertical plane, one possible embodiment of a direct electromagnetic valve 1 according to the present invention, which comprises a tubular element 3 according to the present invention. FIG. 8 shows an electrovalve adapted to be placed in a device or a circuit, e.g. of a water softener, comprised, for example, in a household appliance. In fact, in this figure one can see a portion of valve body 2 having at least one inlet 21, at least one outlet 23, and a connection tract 22, the latter hydraulically connecting said at least one inlet 21 to said at least one outlet 23. Said connection tract 22 comprises a seat 221, e.g. formed in its structure, in which a shutter 16 is arranged. To said shutter 16 core 12 is connected, which is adapted to slide within housing 4 of tubular element 3 according to the present invention for selectively allowing a flow of fluid between inlet 21 and outlet 23 of valve body 2. Said housing 4 comprises a sealing portion 42 of housing 4. As can be understood from the drawings, said tubular element 3 can be removably connected to a valve body 2 while ensuring hydraulic tightness. In the illustrated embodiment, said tubular element 3 is adapted to fit into a seat comprised in valve body 2 (not shown). In the illustrated embodiment, said tubular element 3 is made as one piece. Therefore, said connection portion 5 and said housing 4 are made as one piece. More in detail, said connection portion 5, having a body 50, is adapted to be removably fixed to valve body 2 when tubular element 3 is interlocked with said valve body 2.

In the illustrated embodiment, housing 4, having a body 40, comprises: a cylindrical portion 41 having a closed distal end 41A and an open proximal end; and a sealing portion 42. As aforementioned, said housing 4 internally houses core 12, which is adapted to slide within said cylindrical portion 41.

In the illustrated embodiment, a coil 11 is arranged around tubular element 3, in particular around said cylindrical portion 41 of housing 4, and can generate a magnetic field capable of selectively moving core 12. At distal end 41A of housing 4 there is a locking system 44, which is shown to be in the second configuration, thus locking said coil 11 around cylindrical portion 41 of said housing 4. In the illustrated embodiment body 440 of locking system 44 is visible which, by interacting with said gripping element 441, has undergone a deformation that has increased its outside diameter "D". In this figure one can see that the outside diameter "D" of body 440 of locking system 44 is greater than outside diameter "d" of cylindrical portion 41 of housing 4.

Even more generally, said electromagnetic valve 2 may be either a normally open valve or a normally closed valve, whose features and principles of operation are per se known to those skilled in the art.

More generally, tubular element 3 according to the present invention can be easily used, e.g. as a spare part, and assembled to existing electrovalves 1 as an alternative to prior-art tubular elements 3.

The present invention permits reducing the costs incurred for manufacturing an electromagnetic valve 1, in that it is possible to test the proper operation of coil 11 and the movement of core 12 prior to definitively fixing said coil 11 to housing 4 by using a locking system 44 which is simple to produce, reliable and inexpensive, and which allows coil 11 to be easily assembled to housing 4.

Any alternative embodiments of housing 4, tubular element 3 and/or electromagnetic valve 1 which have not been described in detail herein, but which will be apparent to a person skilled in the art in light of the contents of the present patent application, shall be considered to fall within the protection scope of the present invention.

REFERENCE NUMERALS

Electromagnetic valve 1
Coil 11
Core 12
Diaphragm element 14
Shutter 16
Valve body 2
Inlet 21
Connection tract 22
Seat 221
Outlet 23
Tubular element 3
Housing 4
Body 40
Cylindrical portion 41
Outside diameter "d"
Distal end 41A
Proximal end 41B Sealing portion 42
Connection means 43
Locking system 44
Outside diameter "D"
Body 440
Gripping element 441
First yielding portion 442
Second yielding portion 444
Connection portion 5
Body 50
Threaded portion 51
Gripping elements 52

The invention claimed is:

1. A housing for electromagnetic valves, adapted to internally receive a core and allow the core to slide therein for switching said electromagnetic valve;
   at least a portion of said housing being adapted to be surrounded by a coil comprised in the electromagnetic valve;
   said housing extending along an axis, and comprising a distal end and an open proximal end;
   said housing comprising a locking system adapted to lock said coil;
   wherein said locking system is integrated into said housing and is located at a distal end of said housing;
   said locking system being adapted to assume:
      a first configuration, in which the locking system allows said coil to be positioned around and removed from said at least a portion of said housing;
      a second configuration, different from said first configuration, in which the locking system locks said coil around said at least a portion of said housing;
      said locking system in said first configuration has an outside diameter of a known value;
      said locking system in said second configuration has an outside diameter which is greater than said known value;
   wherein in the first configuration, said locking system maintains said known outside diameter as said coil is positioned around said housing and as said coil is removed from said housing;
   wherein said locking system is configured so that, once the locking system has assumed said second configuration, the locking system cannot assume said first configuration again.

2. The housing according to claim 1, wherein said locking system is made as one piece with said housing.

3. The housing according to claim 1, wherein said locking system and said housing form a monolithic body.

4. The housing according to claim 1, wherein said housing comprises:
   a cylindrical portion having a known outside diameter and extending along said axis, comprising a distal end and an open proximal end;
   a sealing portion, adapted to cooperate with a sealing element comprised in the electromagnetic valve, located at the open proximal end of the cylindrical portion;
   said locking system being made as one piece with said cylindrical portion.

5. The housing according to claim 1, wherein said locking system comprises:
   at least one body having a cylindrical shape;
   at least one first yielding portion, adapted to allow a movement of said body along said axis at least when switching from the first configuration to said second configuration of the locking system;
   at least one second yielding portion adapted to allow the outside diameter of the locking system to increase once the locking system has assumed said second configuration.

6. The housing according to claim 5, comprising a gripping element located at the distal end of the housing;
   wherein said first yielding portion mechanically connects said body to said gripping element; and
   said second yielding portion is formed in said body, permitting a deformation of said body that increases an outside diameter of said body as said body interacts with said gripping element.

7. The tubular element according to claim 5, wherein said tubular element is monolithic.

8. The housing according to claim 1, wherein said first yielding portion is a fracture portion.

9. A tubular element for electromagnetic valves, adapted to be assembled to a valve body comprised in an electromagnetic valve, comprising:
   a connection portion adapted to be removably fixed to said valve body for assembling the tubular element to said valve body;
   the housing according to claim 1.

10. The tubular element according to claim 9, wherein said housing has a body which is separate from and independent of said connection portion, wherein said connection portion has a connection portion body;
    said body of said housing being connectable, in a removable manner, to said connection portion body, and forming an assembly.

11. An electromagnetic valve for household appliances, comprising:
    a valve body having: an inlet, an outlet, and a connection tract adapted to hydraulically connect said inlet to said outlet;
    a sealing element, arranged in a seat formed in said connection tract, adapted to selectively allow a flow of fluid between said inlet and said outlet of the valve body;
    a tubular element adapted to be removably connected to said valve body while ensuring hydraulic tightness in cooperation with said sealing element;
    a core adapted to slide within the tubular element, cooperating with said sealing element to selectively allow a flow of fluid between said inlet and said outlet of the valve body;
    a coil, arranged around said tubular element, adapted to generate a magnetic field for selectively moving said core;
    wherein said tubular element comprises the tubular element according to claim 9.

12. The electromagnetic valve according to claim 11, wherein said electromagnetic valve comprises either a direct valve or an indirect valve.

* * * * *